US011165331B2

(12) United States Patent
Hanson

(10) Patent No.: US 11,165,331 B2
(45) Date of Patent: Nov. 2, 2021

(54) DUAL ACTIVE BRIDGE SYSTEMS FOR RIPPLE CANCELATION

(71) Applicant: Hamilton Sundstrand Corporation, Charlotte, NC (US)

(72) Inventor: Michael J. Hanson, Rockford, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 16/671,897

(22) Filed: Nov. 1, 2019

(65) Prior Publication Data
US 2021/0135561 A1 May 6, 2021

(51) Int. Cl.
| | | |
|---|---|---|
| B60L 1/00 | (2006.01) |
| B60L 3/00 | (2019.01) |
| H02G 3/00 | (2006.01) |
| H02M 1/14 | (2006.01) |
| B64D 41/00 | (2006.01) |
| H02M 3/335 | (2006.01) |

(52) U.S. Cl.
CPC ............ *H02M 1/143* (2013.01); *B64D 41/00* (2013.01); *H02M 3/33576* (2013.01); *B64D 2221/00* (2013.01)

(58) Field of Classification Search
CPC .. H02M 1/143; H02M 3/33576; B64D 41/00; B64D 2221/00
USPC .......................................................... 307/9.1
See application file for complete search history.

(56) References Cited

U.S. PATENT DOCUMENTS

| | | | |
|---|---|---|---|
| 6,574,125 B2* | 6/2003 | Matsukawa ....... | H02M 3/33569 363/132 |
| 9,293,917 B2* | 3/2016 | Zhou ......................... | H02J 1/10 |
| 10,224,827 B1 | 3/2019 | Zhu et al. | |
| 10,277,029 B2 | 4/2019 | Pierquet et al. | |
| 10,277,041 B2 | 4/2019 | Zane et al. | |
| 10,389,166 B1 | 8/2019 | Sahoo et al. | |
| 2009/0135628 A1* | 5/2009 | Ye ....................... | H02M 7/2176 363/21.04 |
| 2013/0099581 A1 | 4/2013 | Zhou et al. | |
| 2015/0303814 A1* | 10/2015 | Li .......................... | H02M 3/285 363/21.11 |
| 2018/0367051 A1* | 12/2018 | Agamy ............. | H02M 3/33584 |

FOREIGN PATENT DOCUMENTS

| | | |
|---|---|---|
| CN | 109861552 A | 6/2019 |
| WO | 2018095797 A1 | 5/2018 |
| WO | 2019158567 A1 | 8/2019 |

OTHER PUBLICATIONS

Extended European search report issued in corresponding EP application No. 20205004.3, dated Mar. 25, 2021 (14 pages).

(Continued)

*Primary Examiner* — Richard Tan
(74) *Attorney, Agent, or Firm* — Locke Lord LLP; Daniel J. Fiorello; Gabrielle L. Gelozin

(57) ABSTRACT

A dual active bridge system can include a plurality of dual active bridges (DABs). Each DAB can have a first side connected in parallel and a second side connected in parallel such that each of the plurality of DABs share a common first side capacitor and a common second side capacitor. The plurality of DABs can be configured to be operated to reduce or eliminate ripple current at the first side capacitor and/or second side capacitor.

5 Claims, 2 Drawing Sheets

(56) References Cited

OTHER PUBLICATIONS

Chatterjee Dheeman et al: "HVDC collection system for offshore wind farm", IECON 2016—42nd Annual Conference of the IEEE Industrial Electronics Society, IEEE, Oct. 23, 2016 (Oct. 23, 2016), pp. 4145-4150, XP033034309.

Sha Deshang et al: "Dynamic Response Improvements of Parallel-Connected Bidirectional DC-DC Converters for Electrical Drive Powered by Low-Voltage Battery Employing Optimized Feedforward Control", IEEE Transactions on Power Electronics, Institute of Electronics Engineers, USA, vol. 32, No. 10, Oct. 1, 2017 (Oct. 1, 2017), pp. 7783-7794, XP011649015.

Shiva S M et al: "A new phase shedding and phase adding control scheme for interleaved DAB converter operating in IPOP configuration", 2015 IEEE International Telecommunications Energy Conference (INTELEC), IEEE, Oct. 18, 2015 (Oct. 18, 2015), pp. 1-6, XP032968696.

Grzejszczak Piotr et al: "Bidirectional modular DC/DC converter for directcurrent microgrids", 2017 Progress in Applied Electrical Engineering (PAEE), IEEE, Jun. 25, 2017 (Jun. 25, 2017), pp. 1-7, XP033141831.

Wang Yubin et al: "Sensorless parameter estimation and current-sharing strategy in two-phase and multiphase IPOP DAB DC-DC converters", IET Power Electronics, IET, UK, vol. 11, No. 6, May 29, 2018 (May 29, 2018), pp. 1135-1142, XP006067354.

Sha Deshang et al: "Parallel-connected bidirectional current-fed active bridge DC-DC converters with decentralized control", 2016 IEEE Energy Conversion Congress and Exposition (ECCE), Sep. 18, 2016 (Sep. 18, 2016), pp. 1-7, XP055783202.

Sucameli Matteo: "Design and performance evaluation of a diginified controlled 1 kW three-phase interleaved ZVS converter for plus-in EV and HEV battery charger", 2015 IEEE Applied Power Electronics Conference and Exposition (APEC), IEEE, Mar. 15, 2015 (Mar. 15, 2015), pp. 3101-3108, XP032775357, DOI: 10.1109/APEC.2015.7104794.

Tarisciotti Luca et al: "Evaluation of isolated DC/DC converter topologies for future HVDC aerospace microgrids", 2017 IEEE Energy Conversion Congress and Exposition (ECCE), IEEE, Oct. 1, 2017 (Oct. 1, 2017), pp. 2238-2245, XP033247088, DOI: 10.1109/ECCE.2017.8096437.

* cited by examiner

DUAL ACTIVE BRIDGE SYSTEMS FOR RIPPLE CANCELATION

FIELD

This disclosure relates to dual active bridges (DABs), more specifically to ripple cancellation in DABs.

BACKGROUND

Aircraft continue to utilize ever more electrical components and systems, proliferating power conversion applications as well as power conversion power levels. The dual active bridge converter has found usage in power conversion circuits in aerospace.

The dual active bridge, despite its elegance, produces heavy demands on the converter output capacitor. The output capacitor is the most constrained element in the dual active bridge converter due to the ripple current being comparable in magnitude as the output current. At the power levels currently employed, the output capacitor is nearly at the technological limits of capacitors. With the push to more electric aircraft and ultimately to electric propulsion, the power levels can increase dramatically, making the dual active bridge output capacitor even more impractical. The output capacitor can be the primary constraint in the DAB. Thus, while capacitors will no doubt continue to improve, a different approach is needed.

Such conventional methods and systems have generally been considered satisfactory for their intended purpose. However, there is still a need in the art for improved dual active bridge converters. The present disclosure provides a solution for this need.

SUMMARY

A dual active bridge system can include a plurality of dual active bridges (DABs). Each DAB can have a first side connected in parallel and a second side connected in parallel such that each of the plurality of DABs share a common first side capacitor and a common second side capacitor. The plurality of DABs can be configured to be operated to reduce or eliminate ripple current at the first side capacitor and/or second side capacitor.

The plurality of DABs can include a first DAB and a second DAB. Each DAB can include first side H-bridge and a second side H-bridge having four switches each.

The system can include a control module configured to control the four switches of each H-bridge to commutate diagonal switches at 50% duty cycle. However, the control module can be configured to control the four switches on each of the first side and second side H-bridges of each DAB to cancel ripple.

The control module can be configured to control the each H-bridge of the first DAB and each H-bridge of the second DAB at a common first-side-to-second-side phase shift to control power flow. The control module can be configured to control each H-bridge of the first DAB in an opposite relationship to each corresponding H-bridge of the second DAB such that duty cycle references between the first side of the first DAB and the first side of the second DAB as well as between the second side of the first DAB and the second side of the second DAB are at or about 180 degrees out of phase to reduce or cancel ripple. The control module can be configured to sense excessive ripple and to provide a protective trip to avoid propagation of a failure to the smaller output capacitor.

In accordance with at least one aspect of this disclosure, an aircraft electrical system can include a dual active bridge system as disclosed herein, e.g., as described above. Any suitable application (e.g., bidirectional power supply for an electric propulsion system) is contemplated herein.

In accordance with at least one aspect of this disclosure, a method can include controlling a two or more parallel dual active bridges (DABs) to reduce or cancel output capacitor current ripple. For example, the method can include controlling four switches on each of a first side H-bridge of each DAB and each of a second side H-bridge of each DAB to cancel ripple.

The method can include controlling each H-bridge of the first DAB and each H-bridge of the second DAB at a common first-side-to-second-side phase shift to control power flow. The method can include controlling each H-bridge of the first DAB in an opposite relationship to each corresponding H-bridge of the second DAB such that duty cycle references between the first side of the first DAB and the first side of the second DAB as well as between the second side of the first DAB and the second side of the second DAB are at or about 180 degrees out of phase to reduce or cancel ripple. Reducing current ripple can include providing a first ripple and a second ripple of differing amplitude and/or shape and/or phase such that a first ripple and a second ripple average to a lower amplitude ripple over at least a portion of a signal period. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
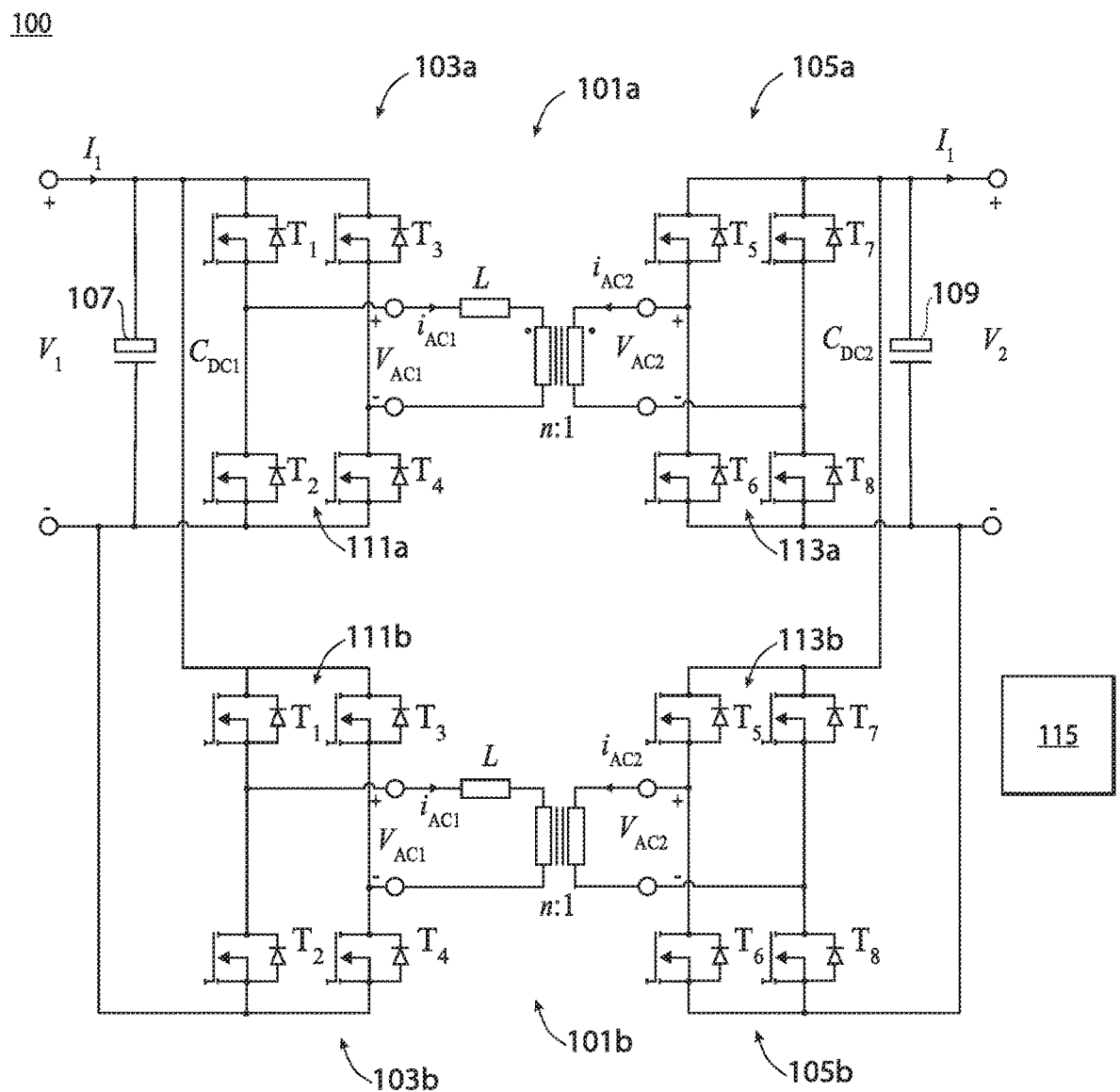
FIG. 1 is a circuit diagram of an embodiment of a dual active bridge (DAB) system in accordance with this disclosure.
Figure 2:
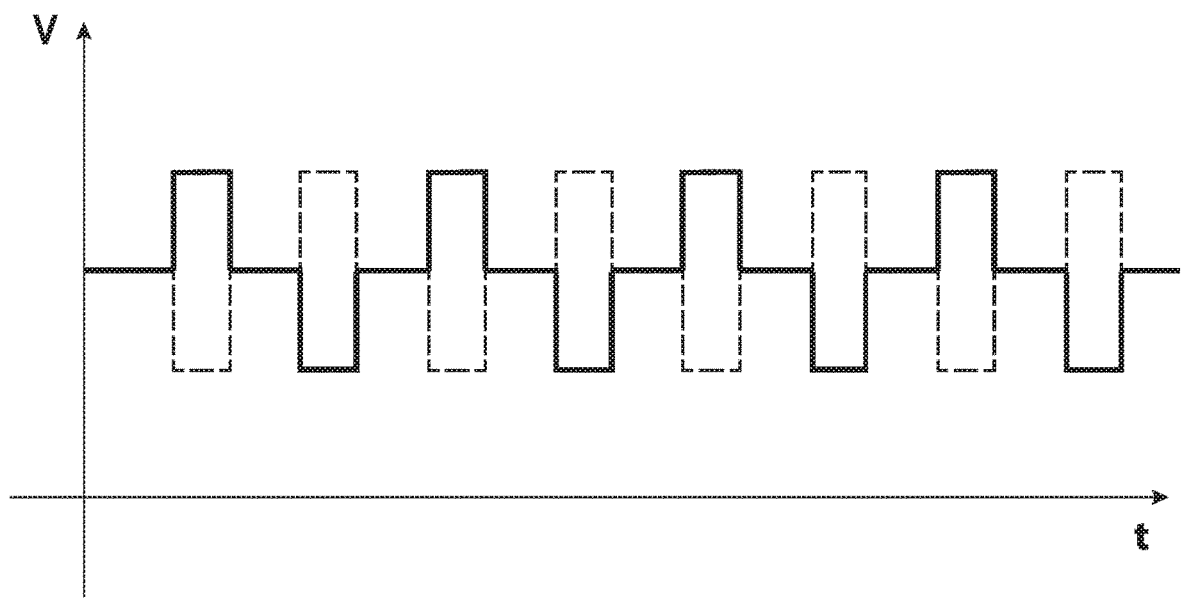
FIG. 2 is a voltage chart of each DAB of the embodiment of FIG. 1 being operated to cancel ripple, wherein the solid line is a first bridge, and the dotted line is a second bridge.
Figure 3:
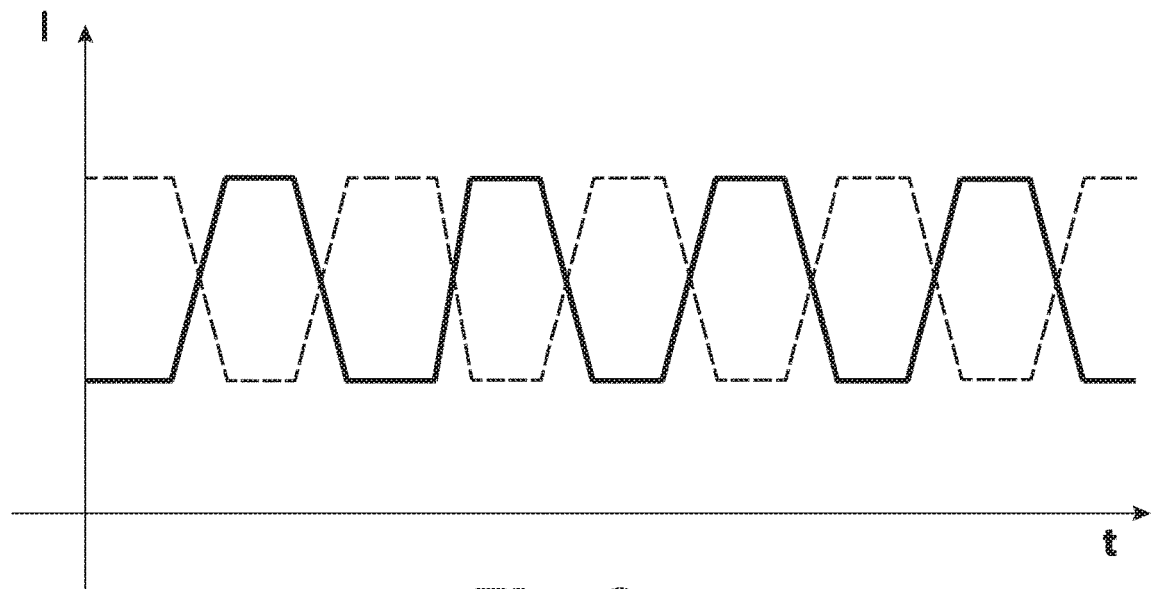
FIG. 3 is a current chart of each DAB of the embodiment of FIG. 1 being operated to cancel ripple, wherein the solid line is a first bridge, and the dotted line is a second bridge.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3.

Referring to FIG. 1, a dual active bridge system can include a plurality of dual active bridges (DABs) 101a, 101b. Each DAB 101a, 101b can have a first side 103a, 103b connected in parallel and a second side 105a, 105b connected in parallel such that each of the plurality of DABs 101a, 101b share a common first side capacitor 107 and a common second side capacitor 109. The plurality of DABs 101a, 101b can be configured to be operated reduce or eliminate ripple current at the first side capacitor 107 and/or second side capacitor 109 (e.g., the output capacitor). For example, ripple can be completely cancelled along an entire period length by providing two or more opposing ripples (e.g., two ripples of the same amplitude and line shape but of offset/180 degree phase such that average ripple is zero), or can be reduced by providing two ripples that are not completely opposing (e.g., of differing amplitude and/or shape and/or phase to reduce or cancel total ripple amplitude over at least some period, e.g., a plurality of ripples of a same amplitude/shape but not of fully offset phase which will reduce ripple to a lower amplitude over a portion of the period).

The plurality of DABs 101a, 101b can include a first DAB 101a and a second DAB 101b, e.g., as shown. Each DAB 101a, 101b can include first side H-bridge 111a, 111b and a second side H-bridge 113a, 113b. Each H-bridge 111a, 111b can have four switches $T_1$, $T_2$, $T_3$, $T_4$, e.g., disposed in an H configuration as appreciated by those having ordinary skill in the art. Any other suitable number of switches and/or any suitable type of switches (e.g., pulse width modulated transistors) are contemplated herein. The system 100 and/or the DABs 101a, 101b can include any other suitable components (e.g., one or more inductors, a transformer linking each side 103a, 103b, etc.) as appreciated by those having ordinary skill in the art.

The system 100 can include a control module 115 configured to control the four switches $T_1$, $T_2$, $T_3$, $T_4$ of each H-bridge 111a, b, 113a, b to commutate diagonal switches (e.g., $T_1$ and $T_4$ and $T_2$ and $T_3$) at 50% duty cycle (e.g., such that half of the time $T_1$ and $T_4$ are closed and the other half of the time $T_2$, and $T_3$ are closed). Any other suitable commutation percentage is contemplated herein. However, the control module 115 can be configured to control the four switches $T_1$, $T_2$, $T_3$, $T_4$ on each of the first side H-bridges 111a, 111b and each second side H-bridges 113a, 113b of each DAB 101a, 101b to cancel ripple. The control module 115 can include any suitable software module(s) and/or hardware module(s) configured to perform any suitable function(s) and/or method(s) disclosed herein or otherwise. The control module 115 can be operatively connected to the switches of each H-bridge to control the state of each switch, for example.

The control module 115 can be configured to control the each H-bridge 111a, 113a of the first DAB 101a and each H-bridge 111b, 113b of the second DAB 101b at a common first-side-to-second-side phase shift to control power flow. For example, if the commutation of the first side H-bridge 111a of the first DAB 101a is 90 degrees phase shifted relative to the commutation of the second side H-bridge 113a of the first DAB 101a, the second DAB 101b can have the same commutation phase shift between the first side 103b and the second side 105b of the second DAB 101b.

However, for example, the control module 115 can be configured to control each H-bridge 111a, 113a of the first DAB 101a in an opposite relationship to each corresponding H-bridge 111b, 113b of the second DAB 101b such that duty cycle references between the first side 103a of the first DAB 101a and the first side 103b of the second DAB 101b as well as between the second side 105a of the first DAB 101a and the second side 105b of the second DAB 101b are at or about 180 degrees out of phase to reduce or cancel ripple. For example, in a 180 degree phase, if the switches $T_1$ and $T_4$ of the first side H-bridge 111a of the first DAB 101a are closed, then the switches $T_2$, and $T_3$ of the first side H-bridge 111b of the second DAB 101b will be closed (and the remaining switches of each first side H-bridge will be open) such that control on each first side 103a, 103b is opposite and each second side 105a, 105b is opposite. Any other suitable ripple reducing phase other than 180 degrees is contemplated herein (e.g., 175 degrees, 170 degrees, anything above 0 degrees). It is contemplated that the further from 180 degrees off phase, the less the effect of ripple reduction, which may be acceptable.

In accordance with at least one aspect of this disclosure, an aircraft electrical system can include a dual active bridge system as disclosed herein, e.g., 100 as described above. Any suitable application (e.g., bidirectional power supply for an electric propulsion system) is contemplated herein.

In accordance with at least one aspect of this disclosure, a method can include controlling a two or more parallel dual active bridges (DABs) to reduce or cancel output capacitor current ripple. For example, the method can include controlling four switches on each of a first side H-bridge of each DAB and each of a second side H-bridge of each DAB to cancel ripple.

The method can include controlling each H-bridge of the first DAB and each H-bridge of the second DAB at a common first-side-to-second-side phase shift to control power flow. The method can include controlling each H-bridge of the first DAB in an opposite relationship to each corresponding H-bridge of the second DAB such that duty cycle references between the first side of the first DAB and the first side of the second DAB as well as between the second side of the first DAB and the second side of the second DAB are at or about 180 degrees out of phase to reduce or cancel ripple. Reducing current ripple can include providing a first ripple and a second ripple of differing amplitude and/or shape and/or phase such that a first ripple and a second ripple average to a lower amplitude ripple (if not cancel) over at least a portion (e.g., all or less than all) of a signal period. The method can include any other suitable method(s) and/or portion(s) thereof.

FIG. 2 shows voltage across the inductor, showing a voltage plot of the first DAB and the second DAB. FIG. 3 shows current in the inductor showing a current plot of the first DAB and the second DAB. FIGS. 2 and 3 show a 180 degree phase relationship between the voltage and current curves between the two DABs.

In certain embodiments, both the input and output bridges of a dual active converter commutate at 50% duty cycle. The phase relationship between input and output bridges determines the flow of power, for example. In embodiments, two smaller (e.g., than traditional) dual active bridge converters can be operated in parallel. They can share a common phase relationship between input and output, in order to share the power as evenly as possible.

In certain embodiments, the duty cycle references between upper and lower DABs, however, can be 180 degrees out of phase. This can allow the two converters to share the power, but the current ripple will approximately cancel. Specifically, odd current harmonics, including the fundamental, will cancel. This leaves only current sub-fundamentals and even current harmonics to stress the output capacitor, for example.

Cancellation of all but sub-fundamentals and even harmonics allows the output capacitor to be much smaller and far less constrained. Embodiments of a control module can monitor for a failure in one bridge that could produce ripple in the output capacitor to protect against such failures. Excessive ripple could be sensed by the control module and result in a protective trip to avoid propagation of the failure to the smaller output capacitor.

While embodiments double the number of bridges, transformers, and inductors each tandem dual active bridge configuration can be smaller than a single large DAB because power is shared. The two bridges can share input and output capacitors, and common control circuitry, for example. Sharing a significantly smaller input and output capacitors can result in a net reduction in size, weight, and/or cost at certain power levels.

As disclosed above, paralleling two dual active converters with shared input and output capacitors, with same input-to-output phase relationship can allow the two bridges to share power. Furthermore, the two converters can be operated 180 degrees out of phase to provide cancellation of fundamental and odd harmonics. This allows the shared output capacitor to be significantly smaller (and more feasible) than is realizable in a single dual active bridge, for example.

As will be appreciated by those skilled in the art, aspects of the present disclosure may be embodied as a system, method or computer program product. Accordingly, aspects of this disclosure, e.g., a control module as disclosed above, may take the form of an entirely hardware embodiment, an entirely software embodiment (including firmware, resident software, microcode, etc.), or an embodiment combining software and hardware aspects. For example, a control module as disclosed above can be a single self-contained unit (e.g., of hardware and/or software) or include any suitable number of separate parts or software components. Furthermore, aspects of this dis-closure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be per-formed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A dual active bridge system, comprising:
   a plurality of dual active bridges (DABs), each having a first side connected in parallel and a second side connected in parallel such that each of the plurality of DABs share a common first side capacitor and a common second side capacitor, the plurality of DABs configured to be operated to eliminate ripple current at the first side capacitor and/or the second side capacitor, wherein the plurality of DABs include a first DAB and a second DAB, wherein each DAB includes a first side H-bridge and a second side H-bridge comprising four switches each; and
   a control module configured to control the four switches of each H-bridge to commutate diagonal switches at 50% duty cycle, wherein the control module is configured to control the four switches on each of the first side and second side H-bridges of each DAB to cancel ripple, wherein the control module is configured to control the each H-bridge of the first DAB and each H-bridge of the second DAB at a common first-side-to-second-side phase shift to control power flow, wherein the control module is configured to control each H-bridge of the first DAB in an opposite relationship to each corresponding H-bridge of the second DAB such that duty cycle references between the first side of the first DAB and the first side of the second DAB as well as between the second side of the first DAB and the second side of the second DAB are at or about 180 degrees out of phase to cancel ripple.

2. An aircraft electrical system, comprising: a dual active bridge system, comprising:
   a dual active bridge system having a plurality of dual active bridges (DABs), each having a first side connected in parallel and a second side connected in parallel such that each of the plurality of DABs share a common first side capacitor and a common second side capacitor, the plurality of DAB s configured to be operated eliminate ripple current at the first side capacitor and/or the second side capacitor, wherein the plurality of DABs include a first DAB and a second DAB, wherein each DAB includes a first side H-bridge and a second side H-bridge comprising four switches each; and
   a control module configured to control the four switches of each H-bridge to commutate diagonal switches at 50% duty cycle, wherein the control module is configured to control the four switches on each of the first side and second side H-bridges of each DAB to cancel ripple, wherein the control module is configured to control the each H-bridge of the first DAB and each H-bridge of the second DAB at a common first-side-to-second-side phase shift to control power flow, wherein the control module is configured to control each H-bridge of the first DAB in an opposite relationship to each corresponding H-bridge of the second DAB such that duty cycle references between the first side of the first DAB and the first side of the second DAB as well as between the second side of the first DAB and the second side of the second DAB are at or about 180 degrees out of phase to cancel ripple.

3. The electrical system of claim 2, wherein the control module is configured to sense excessive ripple and to provide a protective trip to avoid propagation of a failure to the second side capacitor.

4. A method, comprising:
   controlling two or more parallel dual active bridges (DABs) to cancel output capacitor current ripple, wherein controlling includes controlling four switches on each of a first side H-bridge of each DAB and each of a second side H-bridge of each DAB to cancel ripple, wherein controlling includes controlling each H-bridge of the first DAB and each H-bridge of the second DAB at a common first-side-to-second-side phase shift to control power flow, wherein controlling includes controlling each H-bridge of the first DAB in an opposite relationship to each corresponding H-bridge of the second DAB such that duty cycle references between the first side of the first DAB and the first side of the second DAB as well as between the second side of the first DAB and the second side of the second DAB are at or about 180 degrees out of phase to cancel the output capacitor current ripple.

5. The method of claim 4, wherein cancelling the output capacitor current ripple includes providing a first ripple and a second ripple of differing amplitude and/or shape and/or phase such that a first ripple and a second ripple average to a lower amplitude ripple over at least a portion of a signal period.

* * * * *